United States Patent
Hill et al.

(10) Patent No.: US 11,852,860 B2
(45) Date of Patent: Dec. 26, 2023

(54) SCANNING DEVICE LIGHT GUIDE ASSEMBLY HAVING COMPLIANT MEMBER

(71) Applicant: Hewlett-Packard Development Company, L.P., Spring, TX (US)

(72) Inventors: Edward Anthony Hill, San Diego, CA (US); Kyoungrok Kim, Pangyo (KR); Rene Octavio Valenzuela-Rivas, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/908,642

(22) PCT Filed: Mar. 9, 2020

(86) PCT No.: PCT/US2020/021678
§ 371 (c)(1),
(2) Date: Sep. 1, 2022

(87) PCT Pub. No.: WO2021/183099
PCT Pub. Date: Sep. 16, 2021

(65) Prior Publication Data
US 2023/0113842 A1    Apr. 13, 2023

(51) Int. Cl.
H04N 1/024 (2006.01)
F21V 8/00 (2006.01)
G02B 26/08 (2006.01)
G02B 6/00 (2006.01)

(52) U.S. Cl.
CPC ......... *G02B 6/0045* (2013.01); *G02B 6/0055* (2013.01); *G02B 26/0816* (2013.01); *G02B 2006/0098* (2013.01)

(58) Field of Classification Search
CPC .......................... G02B 6/0045; G02B 6/0055; G02B 26/0816; G02B 2006/0098; G02B 26/101; H04N 1/02835; H04N 1/0284; H04N 1/0285; H04N 1/1937
See application file for complete search history.

(56) References Cited

U.S. PATENT DOCUMENTS

| | | | |
|---|---|---|---|
| 7,621,677 B2 | 11/2009 | Yang et al. | |
| 7,658,526 B2 | 2/2010 | Henson et al. | |
| 9,273,848 B2 | 3/2016 | Aramaki et al. | |
| 10,402,609 B2 | 9/2019 | Powell et al. | |
| 11,323,586 B2 * | 5/2022 | Nishida | H04N 1/1937 |

(Continued)

FOREIGN PATENT DOCUMENTS

| | | |
|---|---|---|
| CN | 105737006 A | 7/2016 |
| RU | 2210108 C2 | 8/2003 |
| WO | 2019/152024 A1 | 8/2019 |

*Primary Examiner* — Kent Yip
(74) *Attorney, Agent, or Firm* — Brooks, Cameron & Huebsch, PLLC

(57) ABSTRACT

A light pipe is mounted to a support structure along a length of the light pipe. The light pipe has an end at which light enters the light pipe. Light exits the light pipe at an emissive surface of the light pipe. A reflective backing is positioned at a surface of the light pipe opposite the emissive surface. A compliant member between the reflective backing and the support structure maintains the reflective backing flush against the surface of the light pipe.

15 Claims, 5 Drawing Sheets

(56) References Cited

U.S. PATENT DOCUMENTS

2013/0314756 A1* 11/2013 Amemiya ............ F21V 13/04
                                                              362/613
2016/0062109 A1    3/2016 Morikawa et al.

\* cited by examiner

SCANNING DEVICE LIGHT GUIDE ASSEMBLY HAVING COMPLIANT MEMBER

BACKGROUND

A scanning device, such as a standalone scanner or an all-in-on (AIO) device that combines scanning functionality with other functionality like printing, may optically scan objects like sheets of media as well as three-dimensional (3D) objects to generate digital data of the images on the media sheets or the surfaces of 3D objects. A scanning device outputs light onto the object being scanned, and detects or senses the light reflected by the object to generate a corresponding digital image. The generated digital image may be a full-color or black-and-white image.

DETAILED DESCRIPTION

As noted in the background, a scanning device optically scans an object by outputting light onto the object and detecting or sensing the light reflected back by the object to generate a corresponding digital image. In the case of a two-dimensional (2D) scanning device, the digital image may correspond to the image on the side or surface of a media sheet, such as paper, that has been scanned. In the case of a 3D scanning device, the digital image may correspond to an exterior surface of the object that has been scanned.

To satisfy space constraints as well as for other reasons, a scanning device may employ a light pipe to transfer light from a light source of the device to the emissive surface at which the light exits the device for reflection by the object being scanned. Light pipes can be specified by their efficiency in transferring light from a point of entry to a point of exit. For example, a light pipe having 80% efficiency outputs 80% of the light input into the light pipe. The remaining 20% of the light is lost, escaping from the light pipe other than at the intended emissive surface.

A scanning device can include a reflective backing at the surface of the light pipe opposite the emissive surface at which light exits the light pipe. Usage of such a reflective backing can significantly increase the efficiency of the light pipe, such as by 10-15%. As a result, the scanning device may be able to use a light source that provides lower levels of light, which may result in the scanning device being more spatially compact or less expensive to manufacture. For a given light source, addition of a reflective backing can improve scanning quality of the scanning device.

A reflective backing maximally improves light pipe efficiency if the backing is maintained flush against and in contact with the surface of the light pipe opposite the emissive surface at which light exits the light pipe. If the gaps form between the reflective backing and the light pipe, the improvement in light pipe efficiency may degrade or even be eliminated. Furthermore, if gaps form at some but not other positions along the reflective backing relative to the light pipe, light output over the emissive surface may lack uniformity and negatively impact scanning quality.

Techniques described herein can maintain a reflective backing flush against the surface of the light pipe opposite which light exits the light pipe. A light guide assembly includes the light pipe as well as the reflective backing. The light pipe is mounted to a support structure of the light guide assembly along its length. The light guide assembly includes a compliant member positioned between the reflective backing and the support structure. Compression of the compliant member between the light pipe and the support structure maintains the reflective backing flush against the light pipe.

Figure 1:
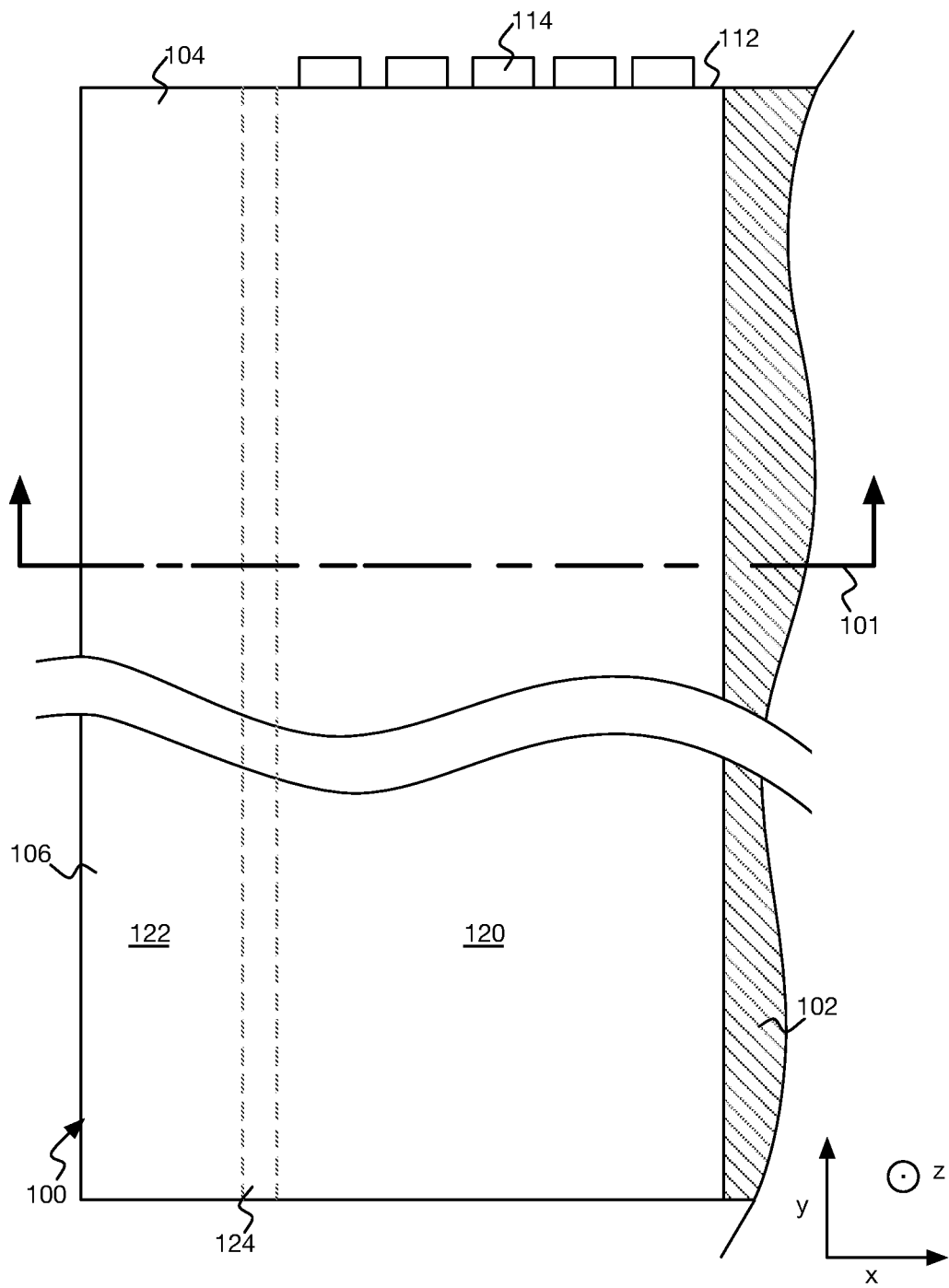
FIG. 1 is a top-view diagram of an example scanning device light guide assembly having a compliant member.
Figure 2:
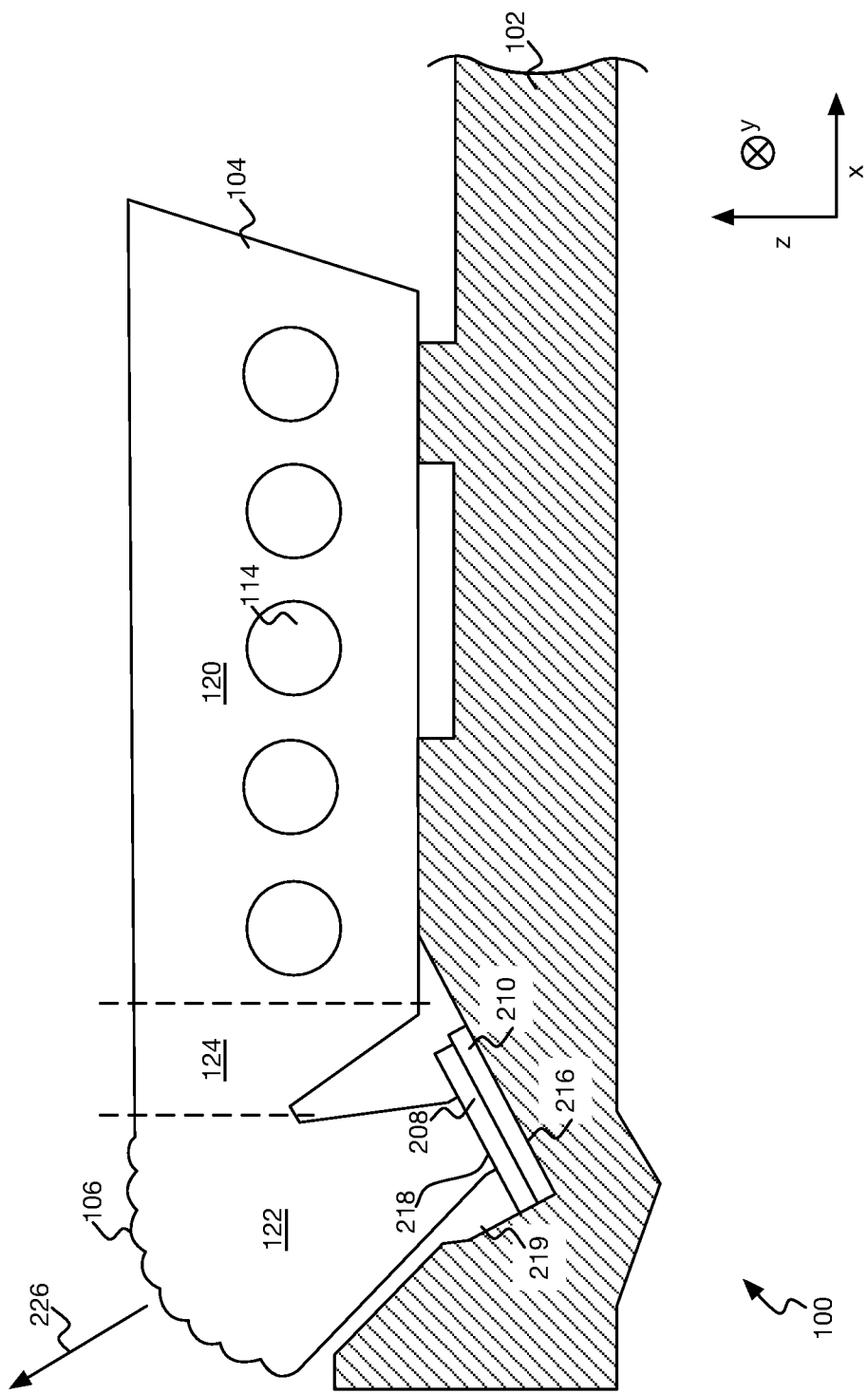
FIG. 2 is a cross-sectional front-view diagram of the example light guide assembly of FIG. 1.

FIG. 1 shows a top view of an example light guide assembly 100 for a scanning device. FIG. 2 shows a cross-sectional front view of the light guide assembly 100 at the cross section indicated by the line 101 in FIG. 1. The x-, y-, and z-axes are identified in both FIGS. 1 and 2. The top view of FIG. 1 corresponds to a plane over the x- and y-axes. The cross-sectional front view of FIG. 2 corresponds to plane over the x- and z-axes. Reference numbers beginning with the numeral "1" are identified in both FIGS. 1 and 2, whereas reference numbers beginning with the numeral "2" are identified in just FIG. 2.

The light guide assembly 100 includes a support structure 102, a light pipe 104, an emissive surface 106, a reflective backing 208, and a compliant member 210. The support structure 102 may be plastic or another material, and may be formed by injection molding or in another manner. The light pipe 104 is mounted to the support structure 102 along the length of the light pipe 104, over the y-axis. Light enters the light pipe 104 at an end 112 at which a light source 114 is situated. The light source 114 may include light-emitting diodes (LEDs), such as one blue, two red, and two green LEDs.

Light exits the light pipe at the emissive surface 106 of the light pipe 104. The light pipe 104 thus transfers light entering the light pipe 104 at the end 112 of the light pipe 104 to the emissive surface 106 at which the light exits the light pipe 104. The emissive surface 106 may in cross-sectional shape include a number of adjacent round or semi-circular bumps, as depicted in FIG. 2. The emissive surface 106 may be integral to the light pipe 104. In another implementation, the emissive surface 106 may be a lens separate from but attached to the light pipe 104.

The reflective backing 208 is positioned at the surface 218 of the light pipe 104 opposite the emissive surface 106. The reflective side of the reflective backing 208 is specifically adjacent to the surface 218. The surface 218 of the light pipe 104 may be orthogonal to the direction at which light exits the emissive surface 106, which is indicated by arrow 226. Positioning of the reflective backing 208 flush against the surface 218 increases the efficiency of the light pipe 104 in transferring light from the end 112 at which the light enters the light pipe 104 to the emissive surface 106 at which the light exits the light pipe 104.

The compliant member 210 is positioned between the reflective backing 208 and the support structure 102. The compliant member 210 may be a low-density foam strip or other type of compliant member. The compliant member 210 maintains the reflective backing 208 flush against the surface 218 of the light pipe 104 so that the backing 208 maximally improves efficiency of the light pipe 104. Specifically, mounting of the light pipe 104 to the support structure 102 compresses the compliant member 210 against the support structure 102 and vice-versa.

Compression of the compliant member 210 between the reflective backing 208 and the support structure 102 can compensate for manufacturing tolerances of the surface 216 of the support structure 102 opposite the surface 218 of the light pipe 104 against which the member 210 maintains the backing 208 flush. In the case in which the support structure 102 is injected molded, the surface 216 may be imperfectly flat, and marred by burrs, bumps, pits, and other artifacts resulting from the molding process. The compliant member 210 shields the reflecting backing 208 from such artifacts so that no gaps form between the backing 208 and the light pipe 104.

Usage of the compliant member 210 to maintain the reflective backing 208 flush against the surface 218 of the light pipe 104 means that the backing 208 may not have to be adhesively affixed to the light pipe 104 at the surface 218. Such adhesive would introduce gaps between the reflecting backing 208 and the light pipe 104, and otherwise negatively impact the ability of the backing 208 in improving efficiency of the light pipe 104. The reflective backing 208 may instead be adhesively affixed to the compliant member 210, with the member 210 positioned against the support structure 102 prior to mounting of the light pipe 104 to the structure 102.

In the example of FIGS. 1 and 2, the light pipe 104 has a transmissive portion 120 including the end 112, an emission portion 122 at which the emissive surface 106 is disposed, and an intermediate portion 124 between the portions 120 and 122. Light output by the light source 114 enters the transmissive portion 120 at the end 112, and travels along the length of the portion 120 over the y-axis. Light travels from the transmissive portion 120 to the emission portion 122 through or via the intermediate portion 124, and exits the emission portion 122 at the emissive surface 106 of the light pipe 104.

In the example of FIGS. 1 and 2, the support structure 219 includes a slot 219, at the bottom of which the surface 216 is located. The compliant member 210 is disposed at the bottom of the slot 219, and the reflective backing 208 is disposed over the member 210 within the slot 219. The emission portion 122 of the light pipe 104 extends into the slot 219, tapering from the emissive surface 106 towards the opposite surface 218 of the portion 122. In extending into the slot 219, the emission portion 122 contacts the reflective backing 208 and compresses the compliant member 210 against the bottom of the slot 219.

Figure 3:
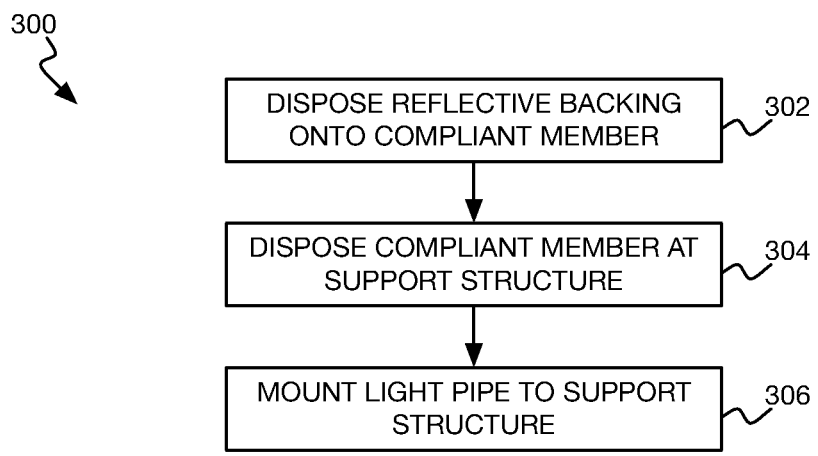
FIG. 3 is a flowchart of an example method for assembling a light guide assembly having a compliant member.

FIG. 3 shows an example method 300 for assembling a light guide assembly, such as the light guide assembly 100 of FIGS. 1 and 2. The method 300 includes disposing a reflective backing onto a compliant member (302). For example, the reflective backing 208 may be adhesively adhered to the compliant member 210. The method 300 includes disposing the compliant member at a support structure (304). For example, the compliant member 210, with the reflective backing 208 adhered to the member 210, may be positioned at the bottom of the slot 219 of the support structure 102.

The reflective backing 208 may thus be adhered to the compliant member 210 prior to the member 210 being disposed at the support structure 102. The method 300 includes mounting a light pipe to the support structure (306), causing the complaint member to maintain the reflective backing flush against the light pipe. For example, after the compliant member 210 has been positioned at the bottom of the slot 219 of the support structure 102, the emission portion 122 of the light pipe 104 may be inserted into the slot 219 to contact the reflective backing 208 and compress the compliant member 210 against the bottom of the slot 219.

Figure 4:
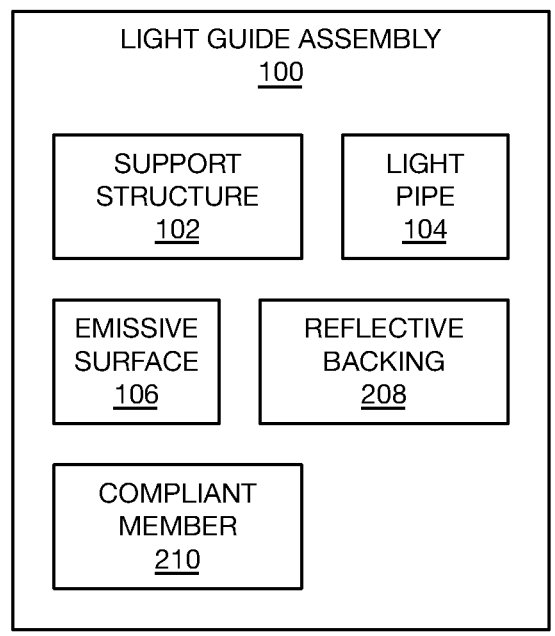
FIG. 4 is a block diagram of an example scanning device light guide assembly having a compliant member.

FIG. 4 shows a block diagram of an example light guide assembly 100, such as the light guide assembly 100 of FIGS. 1 and 2. The light guide assembly 100 includes a support structure 102, and a light pipe 104 mounted to the support structure 102 along a length of the light pipe 104. The light pipe 104 has an end at which light enters the light pipe 104. The light guide assembly 100 includes an emissive surface 106 of the light pipe 104 at which the light exits the light pipe. The light guide assembly 100 includes a reflective backing 208 positioned at a surface of the light pipe 104 opposite the emissive surface 106, and a compliant member 210 between the reflective backing 208 and the support structure 102. The complaint member 210 maintains the reflective backing 208 flush against the surface of the light pipe 104.

Figure 5:
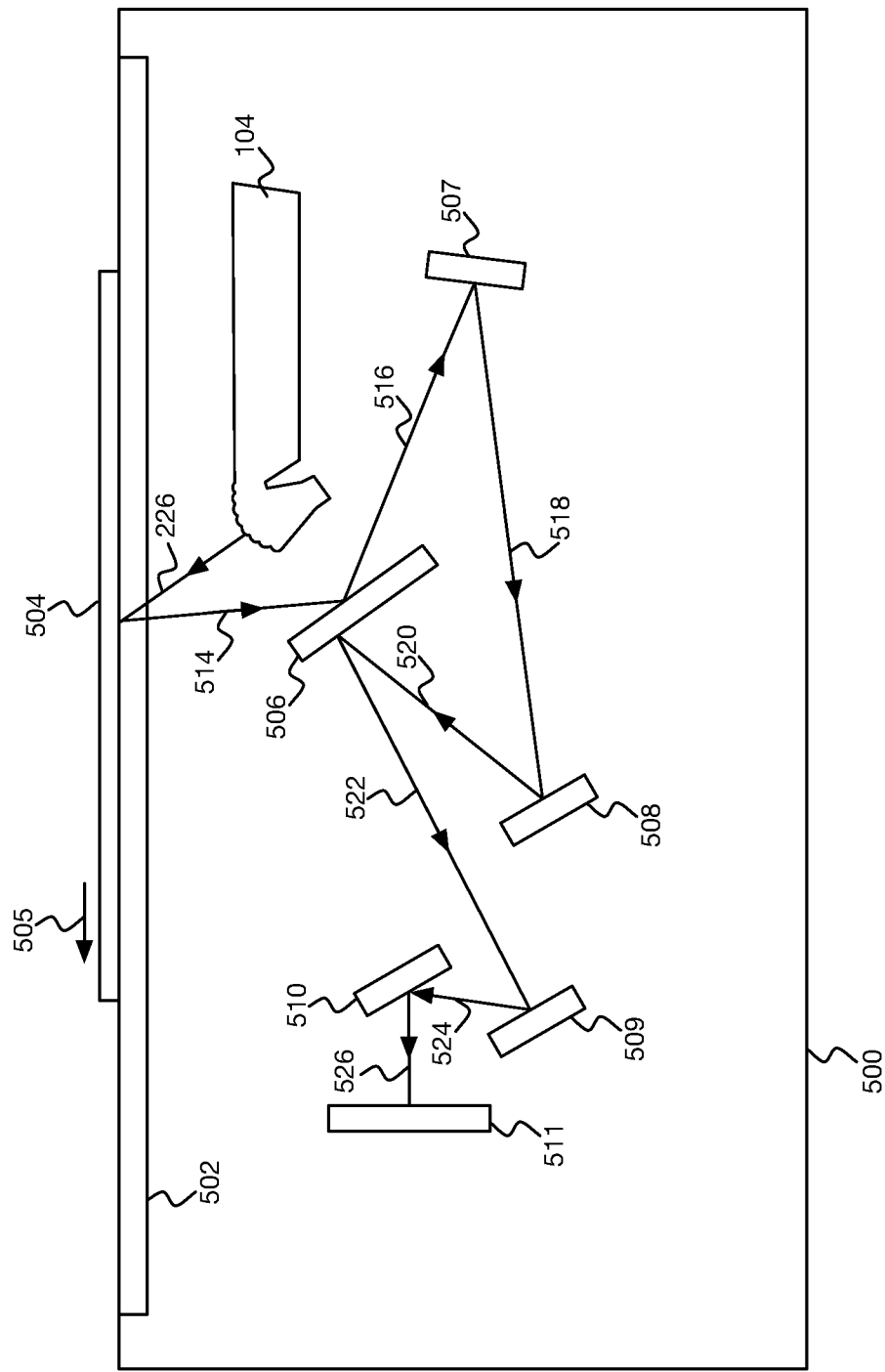
FIG. 5 is a diagram of an example scanning device having a light guide assembly.

FIG. 5 shows an example scanning device 500 that can include the described light guide assembly 100. The scanning device 500 scans a media sheet 504 positioned against a transparent surface 502 of the device 500, as the media sheet 504 is advanced along the surface 502 per arrow 505. The scanning device 500 generates a digital image of the image on the side of the media sheet 504 adjacent to the transparent surface 502. In the example of FIG. the scanning device 500 is a sheet-fed scanning device. The scanning device 500 may instead be a flatbed scanning device, in which case the media sheet 504 remains stationary and componentry of device 500 is moved under the transparent surface 502 to scan the media sheet 504.

The scanning device 500 can include mirrors 506, 507, 508, 509, and 510, and a sensor 511. Light exits the light pipe 104 towards the media sheet 504 per arrow 226. The media sheet 504 reflects the light towards the mirror 506 per arrow 514, and the mirror 506 reflects the lights the light towards the mirror 507 per arrow 516. The mirror 507 reflects the light towards the mirror 508 per arrow 518. The mirror 508 reflects the light back towards the mirror 506 per arrow 520, and the mirror 506 reflects the light towards the mirror 509 per arrow 522. The mirror 509 reflects the light towards the mirror 510, per arrow 524, and the mirror 510 reflects the light towards the sensor 511 per arrow 526. The sensor 511 then detects the incident light.

The side of the media sheet 504 positioned against the transparent surface 502 of the scanning device 500 can be referred to as a scan surface, in that it is the surface that the device 500 scans. The mirrors 506, 507, 508, 509, and 510 cooperatively direct the light reflected by the scan surface towards the sensor 511, which may be a contact image sensor (CIS). The sensor 511 may detect the light reflected by the scan surface so that the scanning device 500 can generate digital data corresponding to the image on the scan surface. The sensor 511 may detect the individual intensities of red, green, and blue light, for instance, so that the scanning device 500 can generate a full-color digital image.

Figure 6:
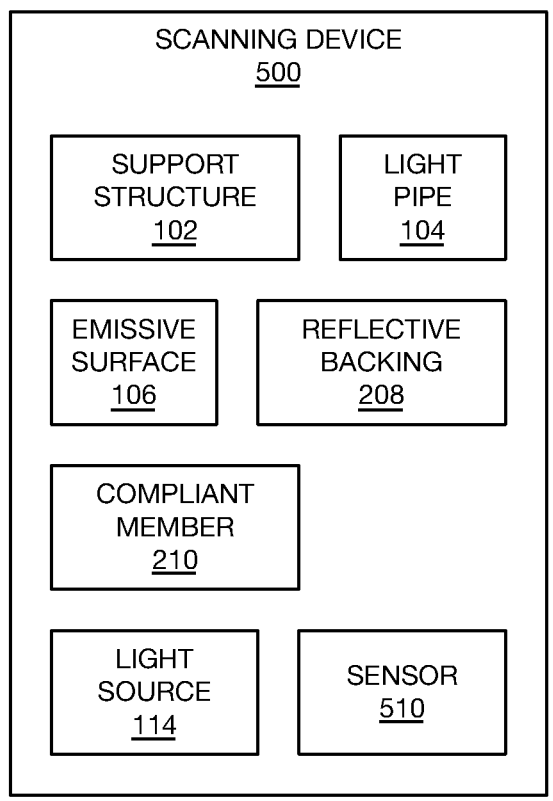
FIG. 6 is a block diagram of an example scanning device having a compliant member.

FIG. 6 shows a block diagram of an example scanning device 500, such as the scanning device 500 of FIG. 5 having the light guide assembly 100 of FIG. 4. The scanning device 500 includes a support structure 102, a light pipe 104 mounted to the support structure 102 along a length of the light pipe 104, and a light source 114 to output light into an end of the light pipe. The scanning device 500 includes an emissive surface 106 of the light pipe 104 at which the light exits the light pipe and to direct the light towards a scan surface. The scanning device 500 includes a sensor 511 to detect the light reflected by the scan surface. The scanning device 500 includes a reflective backing 208 positioned at a surface of the light pipe 104 opposite the emissive surface 106, and a compliant member 210 between the reflective backing 208 and the support structure 102 to maintain the reflective backing 208 flush against the surface of the light pipe 104.

Techniques have been described for maintaining a reflective backing flush against the surface of a light pipe opposite which light exits the light pipe, via a compliant member positioned between the reflective backing and a support structure to which the light pipe is mounted. The compliant member ensures that the reflective backing maximally increases efficiency of the light pipe, in a uniform manner. The compliant member can therefore compensate for manufacturing tolerances of the support structure, permitting cost-effective fabrication of the support structure, such as via injecting molding.

We claim:

1. A light guide assembly for a scanning device, comprising:
    a support structure;
    a light pipe mounted to the support structure along a length of the light pipe, the light pipe having an end at which light enters the light pipe;
    an emissive surface of the light pipe at which the light exits the light pipe;
    a reflective backing positioned at a surface of the light pipe opposite the emissive surface; and
    a compliant member between the reflective backing and the support structure, the compliant member maintaining the reflective backing flush against the surface of the light pipe.

2. The light guide assembly of claim 1, wherein the light pipe as mounted to the support structure compresses the compliant member against the support structure and vice-versa.

3. The light guide assembly of claim 1, wherein the compliant member is compressed between the light pipe and the support structure.

4. The light guide assembly of claim 1, wherein the compliant member is compressible to compensate for manufacturing tolerances of a surface of the support structure opposite the surface of the light pipe against which the compliant member maintains the reflective backing flush.

5. The light guide assembly of claim 1, wherein the compliant member solely maintains the reflective backing flush against the surface of the light pipe, the reflective backing not adhesively affixed to the light pipe.

6. The light guide assembly of claim 1, wherein the reflective backing increases efficiency of the light pipe in transferring the light from the end at which the light enters the light pipe to the emissive surface at which the light exits the light pipe.

7. The light guide assembly of claim 1, wherein the emissive surface is integral to the light pipe.

8. The light guide assembly of claim 1, wherein a portion of the light pipe tapers from the emissive surface towards the surface at which the reflective backing is positioned.

9. The light guide assembly of claim 1, wherein the light pipe comprises:
    an emission portion at which the emissive surface of the light pipe is disposed;
    a transmission portion including the end at which the light enters the light pipe;
    an intermediate portion between and the emission and transmission portions.

10. The light guide assembly of claim 1, wherein the support structure has a slot at a bottom of which the compliant member is disposed, the reflective backing disposed over the compliant member within the slot, a portion of the light pipe having the surface opposite the emissive surface extending into the slot in contact with the reflective backing and compressing the compliant member against the bottom of the slot.

11. A scanning device comprising:
    a support structure;
    a light pipe mounted to the support structure along a length of the light pipe;
    a light source to output light into an end of the light pipe;
    an emissive surface of the light pipe at which the light exits the light pipe and to direct the light towards a scan surface;
    a sensor to detect the light reflected by the scan surface;
    a reflective backing positioned at a surface of the light pipe opposite the emissive surface; and
    a compliant member between the reflective backing and the support structure to maintain the reflective backing flush against the surface of the light pipe.

12. The scanning device of claim 11, wherein the compliant member is compressed between the light pipe and the support structure to compensate for manufacturing tolerances of a surface of the support structure opposite the surface of the light pipe against which the compliant member maintains the reflective backing flush.

13. The scanning device of claim 11, further comprising:
    a mirror to direct the light reflected by the scan surface towards the sensor.

14. A method, comprising:
    disposing a compliant member at a support structure;
    disposing a reflective backing onto the compliant member; and
    mounting a light pipe for a scanning device to the support structure to contact the reflective backing and compress the compliant member against the support structure, causing the compliant member to maintain the reflective backing flush against the light pipe.

15. The method of claim 14, wherein disposing the reflective backing onto the compliant member comprises adhering the reflective backing to the compliant member prior to disposition of the compliant member at the support structure,
    wherein disposing the compliant member at the support structure comprises positioning the compliant member, with the reflective backing adhered thereto, at a bottom of a slot of the support structure,
    and wherein mounting the light pipe to the support structure comprises, after positioning the compliant member at the bottom of the slot of the support structure, inserting a portion of the light pipe into the slot to contact the reflective backing and compress the compliant member against the bottom of the slot.

* * * * *